United States Patent
Tabuteau et al.

(10) Patent No.: US 10,513,348 B2
(45) Date of Patent: Dec. 24, 2019

(54) SUPPORT FOR A RADIO EQUIPMENT OF AN AIRCRAFT, RADIO SYSTEM AND AIRCRAFT

(71) Applicant: DASSAULT AVIATION, Paris (FR)

(72) Inventors: Jérôme Tabuteau, Bordeaux (FR); Jérôme Brunet, Merignac (FR)

(73) Assignee: DASSAULT AVIATION, Paris (FR)

(*) Notice: Subject to any disclaimer, the term of this patent is extended or adjusted under 35 U.S.C. 154(b) by 269 days.

(21) Appl. No.: 15/582,811

(22) Filed: May 1, 2017

(65) Prior Publication Data
US 2017/0320591 A1    Nov. 9, 2017

(30) Foreign Application Priority Data

May 3, 2016  (FR) ...................................... 16 00733

(51) Int. Cl.
*B64D 47/00*    (2006.01)
*B64C 1/36*     (2006.01)
(Continued)

(52) U.S. Cl.
CPC ............... *B64D 47/00* (2013.01); *B64C 1/36* (2013.01); *B64D 45/00* (2013.01); *H01Q 1/125* (2013.01); *H01Q 1/28* (2013.01); *H01Q 1/42* (2013.01); *H01Q 3/06* (2013.01); *B64D 2045/0095* (2013.01)

(58) Field of Classification Search
CPC .................... B64D 45/00; B64D 47/00; B64D 2045/0095; H01Q 1/125; H01Q 1/28; H01Q 1/42; H01Q 3/06
See application file for complete search history.

(56) References Cited

U.S. PATENT DOCUMENTS 3,860,930 A * 1/1975 Peterson ................ H01Q 1/281
                                                        343/705
4,240,596 A * 12/1980 Winderman ............ F42B 10/46
                                                        244/3.16
(Continued)

FOREIGN PATENT DOCUMENTS

EP    3002824 A1    4/2016
FR    2686981 A1    8/1993

OTHER PUBLICATIONS

French Search Report for priority application.

*Primary Examiner* — Bret Hayes
(74) *Attorney, Agent, or Firm* — Davidson, Davidson & Kappel, LLC

(57) ABSTRACT

A support device for a radio equipment of an aircraft, radio system and aircraft are provided. The support device includes a fastening structure (31), intended to be secured to a lower surface of a fuselage of an aircraft, and a support platform (33) of the radio equipment (25). The support platform (33) is mounted pivoting on the fastening structure (31) around a pivot axis (A) between an operational position and a backup position. The support device comprises a locking mechanism (56), able to be actuated from a locked configuration, in which said locking mechanism (56) keeps the support platform (33) in its operational position while preventing any pivoting of the support platform (33), to an unlocked configuration, in which the locking mechanism (56) allows the support platform (33) to pivot relative to the fastening structure (31).

20 Claims, 5 Drawing Sheets

(51) Int. Cl.
*B64D 45/00* (2006.01)
*H01Q 1/28* (2006.01)
*H01Q 1/12* (2006.01)
*H01Q 1/42* (2006.01)
*H01Q 3/06* (2006.01)

(56) References Cited

U.S. PATENT DOCUMENTS

| | | | | |
|---|---|---|---|---|
| 4,593,288 | A * | 6/1986 | Fitzpatrick | B64C 1/36 244/118.1 |
| 5,025,262 | A * | 6/1991 | Abdelrazik | H01Q 1/28 343/705 |
| 5,678,171 | A * | 10/1997 | Toyama | H01Q 1/28 725/76 |
| 6,204,823 | B1 * | 3/2001 | Spano | H01Q 1/125 343/705 |
| 6,977,618 | B1 | 12/2005 | Hanewinkel, III et al. | |
| 7,528,613 | B1 * | 5/2009 | Thompson | G01S 13/953 324/637 |
| 10,116,046 | B1 * | 10/2018 | Fritzel | H01Q 1/3275 |
| 2002/0084396 | A1 * | 7/2002 | Weaver | F16M 11/10 248/278.1 |
| 2014/0225768 | A1 * | 8/2014 | Engel | H01Q 3/08 342/354 |
| 2014/0270927 | A1 | 9/2014 | Carley et al. | |
| 2016/0226150 | A1 * | 8/2016 | Paleta, Jr. | H01Q 19/19 |
| 2016/0359224 | A1 * | 12/2016 | Mellor | H01Q 1/42 |

* cited by examiner

SUPPORT FOR A RADIO EQUIPMENT OF AN AIRCRAFT, RADIO SYSTEM AND AIRCRAFT

This claims the benefit of French Patent Application FR 16 00733, filed May 3, 2016 and hereby incorporated by reference herein.

The present invention relates to a support device for a radio equipment of an aircraft, the support device comprising:
- a fastening structure, configured to be secured to a lower surface of a fuselage of an aircraft,
- a support platform for the radio equipment, configured to receive the radio equipment.

It in particular relates to a support device for a ventral radar of an aircraft, i.e., a radar mounted on a lower surface of the fuselage of the aircraft.

BACKGROUND

Aircraft are generally provided with pieces of radio equipment that can be intended for the communication of the aircraft, such as antennas, or the observation of the aircraft's environment, such as radars. These pieces of equipment cannot, however, be integrated into the cell of the aircraft due to radio disruptions caused by the cell.

It has thus been proposed to mount such a piece of radio equipment, in particular a radar intended to monitor land or sea zones, on the lower part of the fuselage of the aircraft. In order to minimize the aerodynamic disruptions caused by the radar, a radome is attached on the aircraft, covering the radar.

The radar and the radome then protrude relative to the lower surface of the fuselage of the aircraft. Such a configuration has drawbacks. In particular, during emergency landing, the landing gear being retracted, the volume of the radar interferes with the ground and modifies the sliding conditions of the aircraft, relative to an aircraft that does not have such a radar.

In order to minimize such interference, it has been proposed to equip the aircraft with an elevator system making it possible to deploy or withdraw the radar in response to a command from the pilot. Such a system, situated in a non-pressurized space, comprises a platform that is translatable through hydraulic or electric slaving. The platform is generally retracted during the takeoff, cruising and landing phases, and deployed upon approaching a working zone.

SUMMARY OF THE INVENTION

However, such a system is not fully satisfactory.

In particular, the system must be positioned in an unpressurized space, and is not compatible with the configuration of the pressurized cabin of certain types of aircraft, situated just above the radar. Furthermore, such a system requires a major modification of the primary structure of the aircraft, which makes it impossible to redevelop an existing aircraft in order to incorporate this system therein.

Furthermore, the necessary use of a hydraulic or electric energy source to deploy the platform, as well as various associated cases, control valves and sensors, makes this solution complex to implement. Additionally, all of these elements include failure risks, accentuated by the fact that the elevator system is activated during each mission. Maintenance of the system may therefore prove complex and costly.

One aim of the invention is therefore to resolve these drawbacks, in particular to propose a support device for a piece of radio equipment such as a radar that makes it possible to minimize the interference of the radio equipment with the ground during emergency landing and that can be installed on an aircraft independently of the primary structure of this aircraft, and without major modification of the primary structure.

To that end, a support device of the aforementioned type is provided, characterized in that:
- the support platform is mounted pivoting on the fastening structure around a pivot axis between an operational position and a backup position,
- the support device further comprises a locking mechanism, able to be actuated from a locked configuration, in which the locking mechanism keeps the support platform in its operational position while preventing any pivoting of the support platform around the pivot axis, to an unlocked configuration, in which the locking mechanism allows the support platform to pivot relative to the fastening structure around the pivot axis, toward its backup position.

According to specific embodiments of the invention, the support device also comprises one or more of the following features, considered alone or according to any technically possible combination(s):
- in the operational position, the support platform is configured to keep the radio equipment in a deployed position, in which the radio equipment is intended to protrude in a direction substantially orthogonal to the lower surface of the fuselage, and in the backup position, the support platform is configured to keep the radio equipment in a retracted position, in which the radio equipment is intended to be housed in a refuge zone of said fuselage;
- the support device further includes a control mechanism, able to be actuated by an operator, said locking mechanism being able to be actuated from the locked configuration to the unlocked configuration when an operator actuates the control mechanism;
- said locking mechanism comprises at least one locking finger movable from a locked position, in which said at least one locking finger prevents any pivoting of the support platform around the pivot axis, and an unlocked position, in which said at least one locking finger allows the support platform to pivot relative to the fastening structure around the pivot axis;
- said control mechanism is configured so as, when it is actuated, to move said at least one locking finger from its locked position to its unlocked position;
- said at least one locking finger comprises at least one frangible zone, configured to break under the effect of an impact on said radio equipment, said locking mechanism being able to be actuated from the locked configuration to the unlocked configuration by breaking said frangible zone under the effect of the impact of said radio equipment;
- the support platform is configured to pivot around the pivot axis from its operational position to an intermediate equilibrium position, when the locking mechanism is actuated from the locked configuration to the unlocked configuration;
- the support device further comprises a return mechanism, configured to exert a return force on the support platform, said return mechanism being configured so as, when the locking mechanism is in the unlocked configuration, to pivot the support platform around the pivot axis from its operational position to its intermediate equilibrium position;

the support device comprises a non-return mechanism, configured so as, when the locking mechanism is in the unlocked configuration, to prevent the support platform from pivoting to its operational position;

the non-return mechanism is configured so as, when a pivot angle of the support platform exceeds a predetermined threshold value, said threshold value corresponding to a threshold position of the support platform, to prevent the support platform from pivoting toward the operational position on that side of said threshold position;

said predetermined threshold value is comprised between 35° and 45°;

the non-return mechanism comprises at least one retractable finger, configured to be deployed during pivoting of the support platform around the pivot axis toward its backup position when the pivot angle of the support platform reaches said predetermined threshold value, the retractable finger being configured so as, when it is deployed, to prevent the support platform from pivoting toward the operational position on that side of said threshold position.

A radio system is also provided comprising a support device according to the invention and a piece of radio equipment mounted on said support platform.

An aircraft is also provided comprising a fuselage and a radio system according to the invention, the structure for fastening the support device being secured to a lower surface of the fuselage.

According to one particular embodiment of the invention, the aircraft further includes a radome attached on the fuselage and covering said radio system.

BRIEF SUMMARY OF THE INVENTION

Other features and advantages of the invention will appear upon reading the following description, provided solely as an example and done in reference to the appended figures, in which.

DETAILED DESCRIPTION

The orientation terms used below will be terms associated with the usual plane of reference for aircraft, shown in the figures, and which comprises:

a longitudinal direction X, oriented from front to back,
a transverse direction Y, perpendicular to the longitudinal direction X and oriented from left to right, and
a vertical direction Z, perpendicular to the horizontal plane defined by the longitudinal X and transverse Y directions and oriented from bottom to top.

Figure 1:
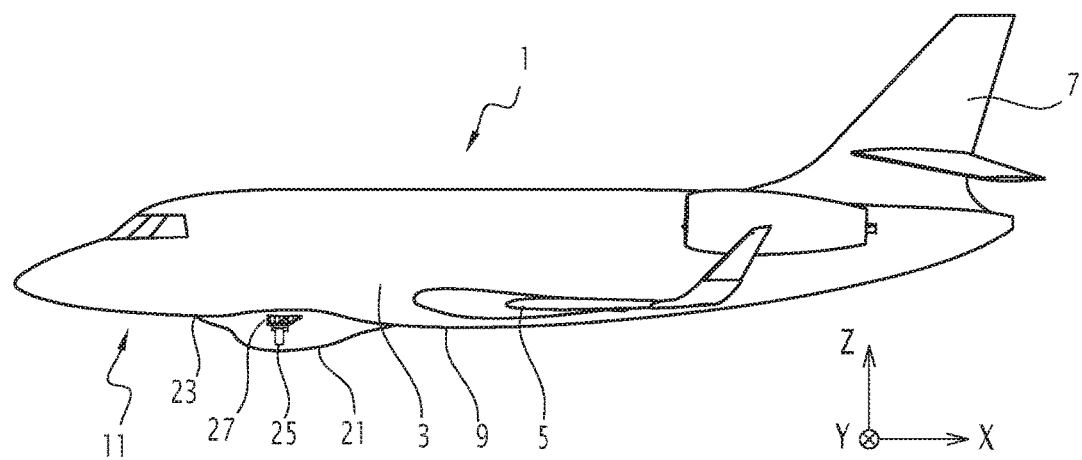
FIG. 1 is a profile view of an aircraft according to one embodiment of the invention.

FIG. 1 illustrates an aircraft 1 according to one embodiment. This aircraft 1, which is an airplane in the illustrated example, comprises a fuselage 3, elongated in the longitudinal direction of the aircraft 1, an airfoil 5, an empennage 7, a wing root fairing 9, for connecting the airfoil 5 to the fuselage 3. The aircraft 1 also includes a front landing gear, which is retracted and thus not visible in FIG. 1, but the location of which is indicated by general reference 11.

The aircraft 1 also includes a radome 21. The radome 21 is attached on a lower surface 23 or belly surface of the fuselage 3, between the front landing gear 11 and the wing root fairing 9.

A piece of radio equipment 25 and a support device 27 for the radio equipment 25 are housed inside the radome 21. The radome 21 thus covers the support device 27 and the piece of radio equipment 25.

The support device 27 is mounted on the lower surface 23 of the fuselage 3. The piece of radio equipment 25 is mounted on the support device 27.

Figure 2:
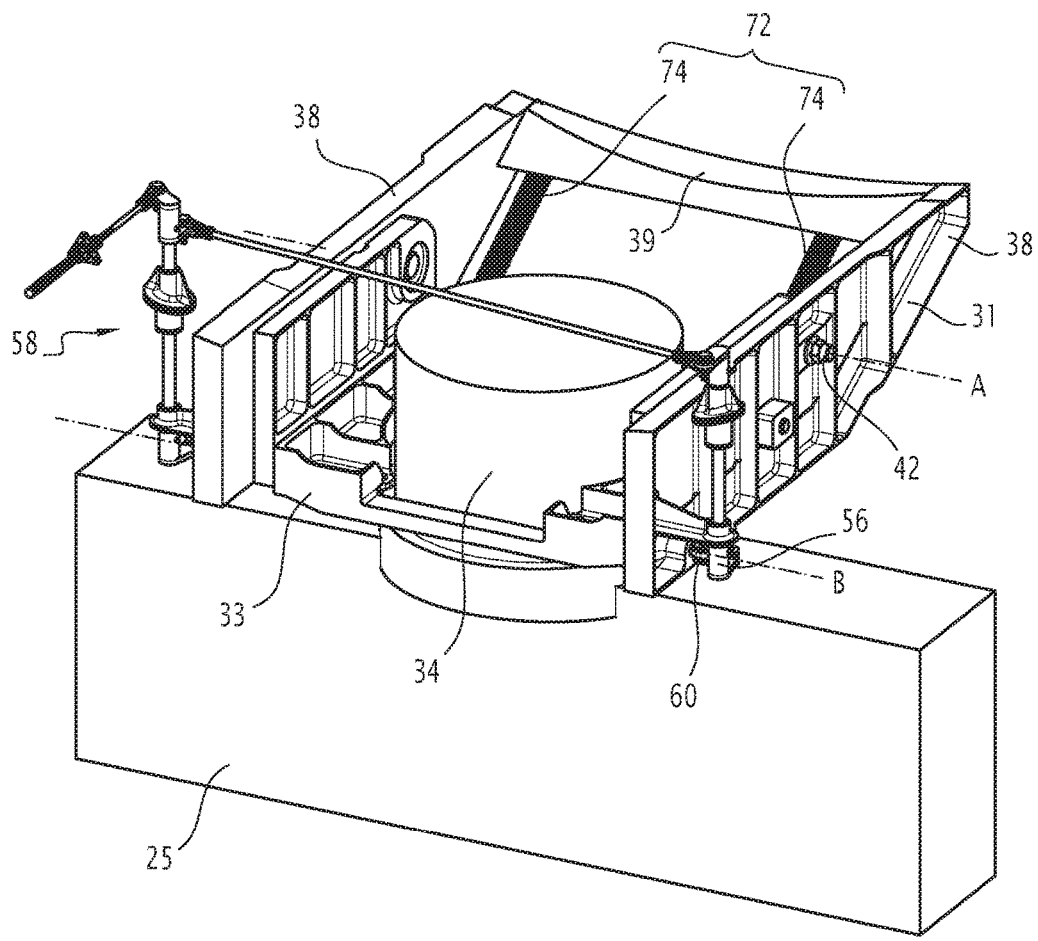
FIG. 2 is a perspective view of a support device according to one embodiment of the invention, in an operational position, and a piece of radio equipment mounted on this support device.
Figure 3:
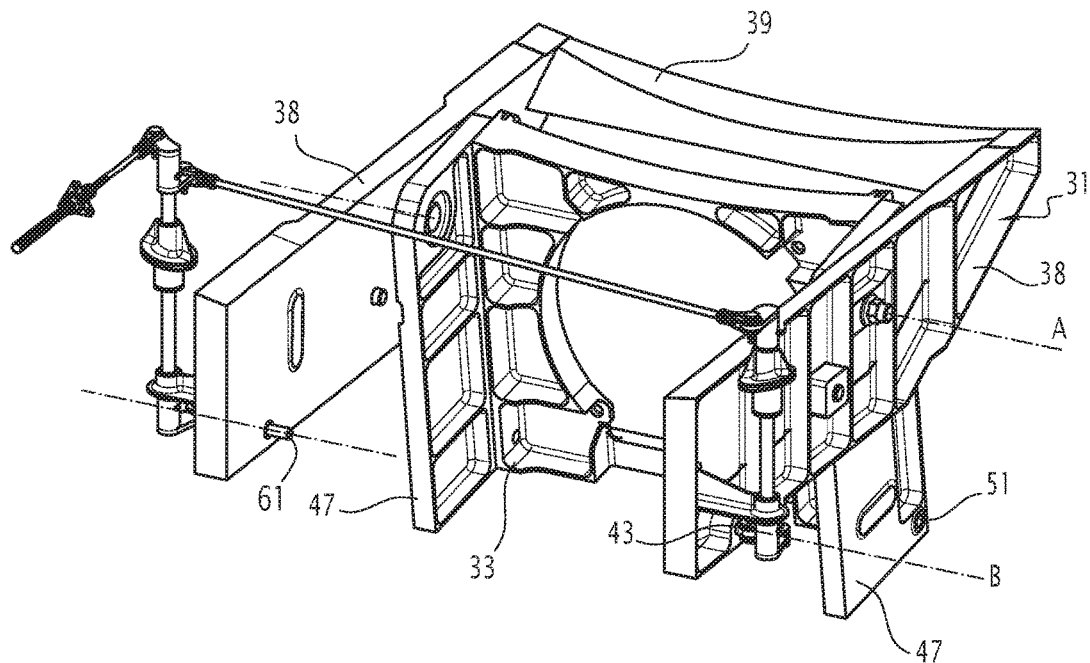
FIG. 3 is a perspective view of the support device of FIG. 2, in a backup position.

As illustrated in FIGS. 2 and 3, the support device 27 comprises a fastening structure 31 and a support platform 33 of the piece of radio equipment 25.

The radio equipment 25, shown only in FIG. 2, is for example a radar. The radio equipment 25 for example has a height of about 0.5 m and a width of about 1 m, and a thickness of about 0.2 m.

The radio equipment 25 comprises a stationary part and a part rotatable around a vertical axis, mounted on the stationary part.

In particular, the radio equipment 25 is provided with an element 34 intended to assemble this radio equipment 25 to the support platform 27, as described below. This assembly element 34 is preferably generally cylindrical. This assembly element 34 forms the stationary part of the radio equipment 25.

The fastening structure 31 is intended to be secured to the lower surface 23 of the fuselage 3. In particular, when it is mounted on the lower surface 23, the fastening structure 31 is not movable relative to the fuselage 3.

The support platform 33 is mounted pivoting on the fastening structure 31, around a pivot axis A.

When the support device 27 is mounted on the lower surface 23 of the fuselage 3, the pivot axis A extends in a transverse direction.

The support platform 33 is mounted pivoting on the fastening structure 31 around the pivot axis A between an operational position, illustrated in FIG. 2, and a backup position, illustrated in FIG. 3, via an intermediate equilibrium position, situated between the operational position and the backup position. By way of simplification, the radio equipment 25 is not shown in FIG. 3.

In the operational position, the fastening structure 31 and the support platform 33 are housed in one another. In the described example, the support platform 33 is housed in the fastening structure 31 in its operational position.

The pivot angle formed between the support platform 33 when it is in the operational position and the support platform when it is in the backup position is preferably comprised between 90° and 110°, in particular equal to 98°.

Subsequently, the intermediate position, including the intermediate equilibrium position, will refer to a position of the support platform 33 comprised between its operational position and its backup position. The pivot angle of the platform, associated with a position of the platform, will also refer to the angle formed between the support platform 33 when it is in its operational position and the support platform 33 in this position.

Preferably, the support platform 33 is movable relative to the fastening structure 31 with a single degree of freedom, corresponding to pivoting around the pivot axis A.

Furthermore, the support platform 33 is able to pivot relative to the fastening structure 31 only between the operational position and the backup position.

The support platform 33 is configured to receive the radio equipment 25 and to serve as support for the radio equipment 25.

The support platform 33 comprises for a support for supporting the radio equipment 25. This support does not hinder the rotation of the moving part of the radio equipment 25.

In the operational position, the support platform 33 is configured to keep the radio equipment 25 in a deployed position. In this deployed position, the radio equipment 25 protrudes in a vertical direction, i.e., substantially orthogonal to the lower surface 23 of the fuselage 3. This operational position corresponds to the normal usage conditions of the radio equipment 25.

The intermediate equilibrium position is a position occupied by the support platform 33 following the actuation of a locking mechanism (driving the unlocking of the mechanism) in response to a manual command by an operator or as the result of an impact on the radio equipment. In particular, the intermediate equilibrium position is a position occupied by the support platform 33 after the latter pivots around the pivot axis A from the operational position, this pivoting being authorized as a result of the actuation of the locking mechanism.

The backup position is a position occupied following landing of the aircraft 1, in case of failure of the landing gear preventing it from being deployed, the aircraft 1 then being forced to land on its belly. In particular, the backup position is a position occupied by the support platform 33 after the latter pivots around the pivot axis A from the intermediate equilibrium position, this pivoting being caused by contact of the radio equipment 25 on the ground.

In the backup position, the support platform 33 is configured to keep the radio equipment 25 in a retracted position, in which the radio equipment 25 is housed in a refuge zone of the fuselage.

Figure 4:
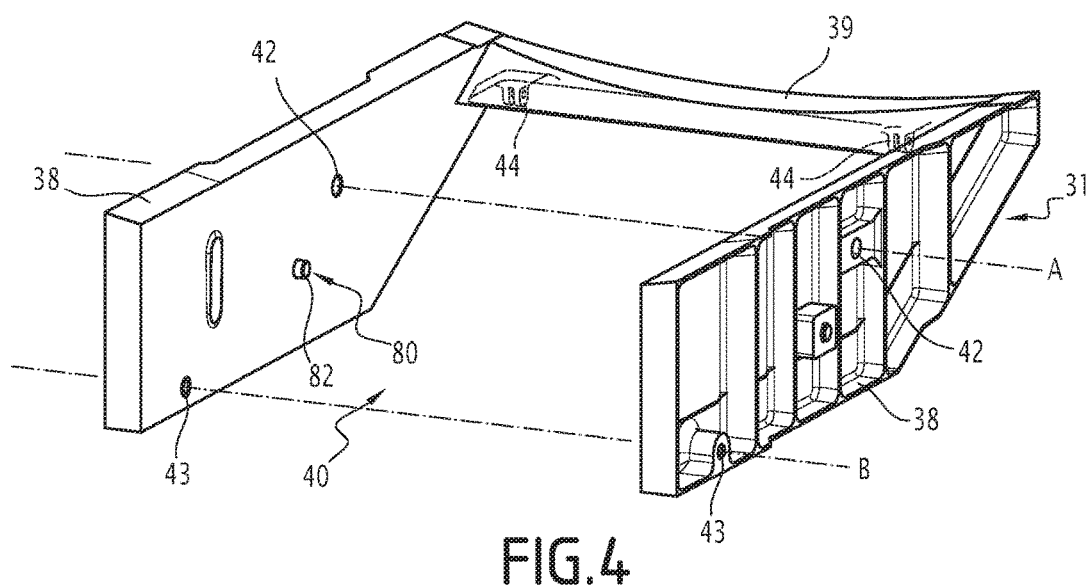
FIG. 4 is a perspective view of a fastening structure for the support device of FIG. 2.
Figure 5:
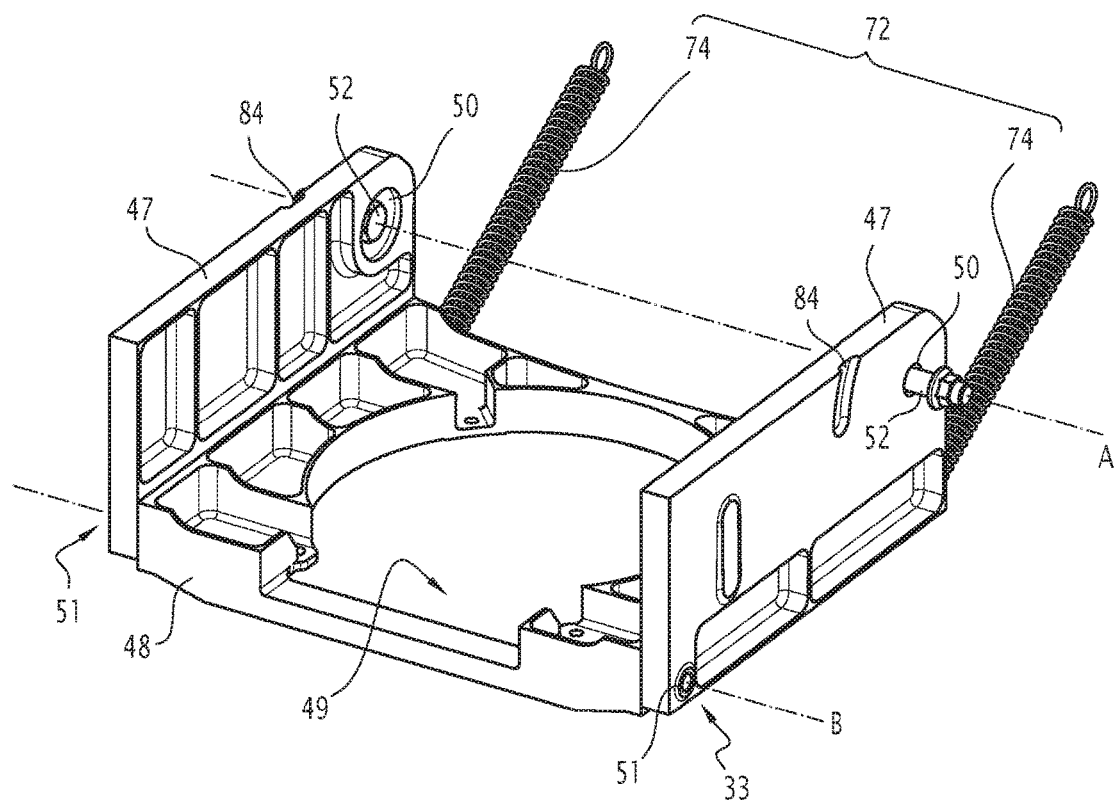
FIG. 5 is a perspective view of a support platform for the support device of FIG. 2.

As illustrated in more detail in FIG. 4, the fastening structure 31 comprises two longitudinal uprights 38, and one transverse upright 39.

The longitudinal uprights 38 and the transverse upright 39 are intended to be fastened to the lower surface 23 of the fuselage 3 of the aircraft 1.

Each longitudinal upright 38 is intended to extend parallel to a vertical longitudinal plane, when the fastening structure 31 is mounted on the lower surface 23, parallel to one another and across from one another.

The transverse upright 39 connects the rear ends of the two longitudinal uprights 38 to one another.

The longitudinal uprights 38 and the transverse upright 39 thus define a space 40 intended to receive the support platform 33 in the operational position.

Each of the longitudinal uprights 38 comprises a through pivot bore 42, the pivot bores 42 of the two longitudinal uprights 38 being aligned along a transverse axis corresponding to the pivot axis A.

Each of the longitudinal uprights 38 further comprises a locking bore 43. The locking bores 43 of the two longitudinal uprights 38 are aligned along a transverse locking axis B, parallel to the pivot axis A, situated in front of the pivot axis A.

The transverse upright 39 comprises, near each of its two ends, a member 44 for attaching a return mechanism, as described in more detail below.

The support platform 33 is configured to be housed in the fastening structure 31, in particular in the space 40 defined by the longitudinal uprights 38 and the transverse upright 39, in its operational position.

The support platform 33 comprises two longitudinal uprights 47 that each extend in a vertical longitudinal plane, parallel to one another. When the support platform 33 is in its operational position, the longitudinal uprights 47 are across from the longitudinal uprights 38 of the fastening structure 31.

The support platform 33 further comprises a plate 48 connecting the two longitudinal uprights 47 to one another. The plate 48 is intended to extend in a substantially horizontal plane in the operational position of the support platform 33. The plate 48 comprises a substantially circular central recess 49, intended to receive the element 34 of the radio equipment 25.

Each of the longitudinal uprights 47 comprises a pivot bore 50. The pivot bores 50 are aligned along a transverse axis corresponding to the pivot axis A, and are therefore aligned with the pivot bores 42.

Each of the longitudinal uprights 47 also comprises a locking bore 51. The locking bores 51 of the two longitudinal uprights 47 are aligned along a transverse axis parallel to the pivot axis A, situated in front of the pivot axis A. In particular, when the support platform 33 is in its operational position, the locking bores 51 are aligned with the locking bores 43 of the longitudinal uprights 38 of the fastening structure 31, along the locking axis B.

The support device 27 further comprises two pivots 52 for assembling the support platform 33 to the fastening structure 31, the pivot 52 connecting the support platform 33 to the fastening structure 31 while allowing the support platform 33 to pivot relative to the fastening structure 31.

Each pivot 52 is mounted in a pivot bore 42 of a longitudinal upright 38 of the fastening structure 31 and in the pivot bore 50 of the corresponding longitudinal upright 47 of the support platform 33.

The support device 27 also includes a lock in the form of a mechanism 56 for locking the pivoting of the support platform 33 relative to the fastening structure 31 around the pivot axis A.

The locking mechanism 56 can be actuated from a locked configuration to an unlocked configuration.

In the locked configuration, the locking mechanism 56 is configured to keep and block the support platform 33 in its operational position, preventing any pivoting of the support platform 33 relative to the fastening structure 31 around the pivot axis A.

In the unlocked configuration, the locking mechanism 56 allows the support platform 33 to pivot relative to the fastening structure 31 around the pivot axis A, toward its backup position, in particular to its intermediate equilibrium position.

In particular, when the locking mechanism 56 is in its unlocked configuration, the support platform 33 is free to pivot to its intermediate equilibrium position, under the effect of the gravitational force exerted on the support platform 33, and preferably under the additional effect of a return force exerted on the support platform 33 via a return mechanism, as described below.

The intermediate equilibrium position is thus the intermediate position occupied by the platform when the locking mechanism 56 is in its unlocked configuration, in the absence of contact with the ground.

Furthermore, when the locking mechanism 56 is in its unlocked configuration, the support platform 33 is free to pivot from its intermediate equilibrium position to its backup position when it comes into contact with the ground, during landing in case of failure of the landing gear preventing the latter from being deployed.

Preferably, the locking mechanism 56 is configured to be actuated from its locked configuration to its unlocked configuration in response to a manual command by an operator and/or as a direct result of an impact on the radio equipment.

"As a direct result" means that the locking mechanism 56 is actuated by the force generated by the impact.

The support device 27 further includes a control mechanism 58, able to be actuated by an operator in order to actuate the locking mechanism 56 from its locked configuration to its unlocked configuration.

Figure 6:
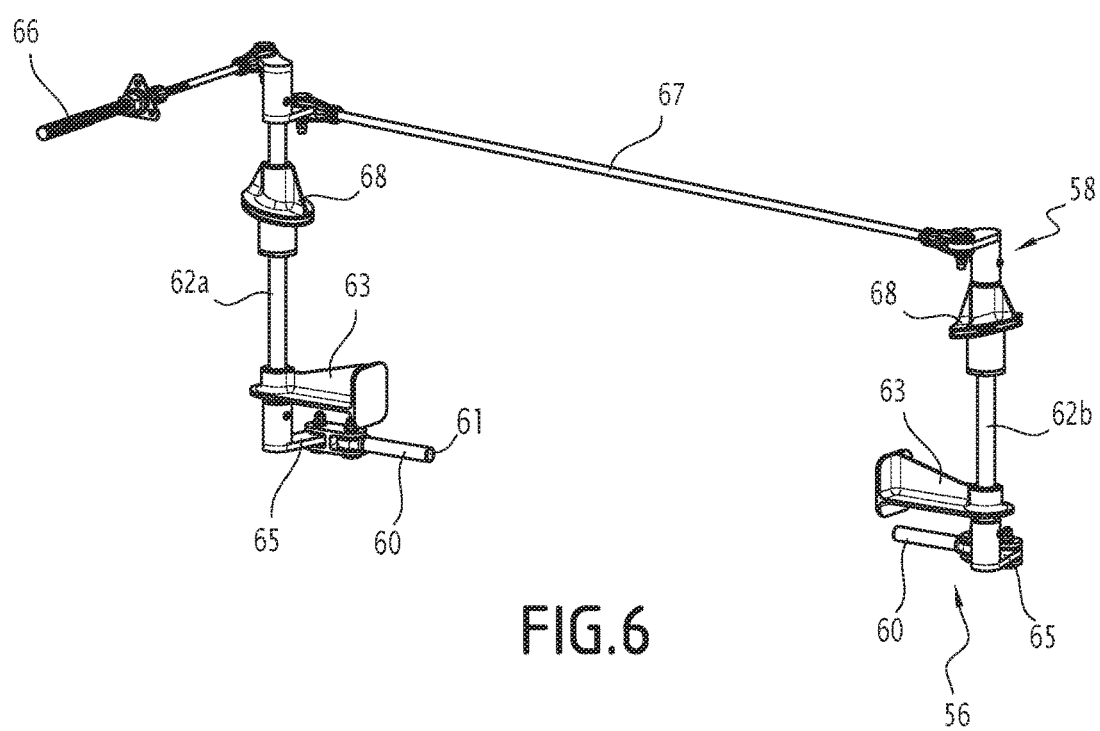
FIG. 6 is a perspective view of a locking mechanism and a control mechanism for the support device of FIG. 2.

As illustrated in FIG. 6, the locking mechanism 56 in particular comprises a set of two locking fingers 60.

The locking fingers 60 are movable from a locked position, corresponding to the locked configuration, in which the locking fingers 60 prevent any pivoting of the support platform 33 around the pivot axis A, and an unlocked position, corresponding to the unlocked configuration, in which the locking fingers allows the support platform 33 to pivot around the pivot axis A.

In particular, in the locked position, each locking finger 60 is positioned in the locking bore 43 of a longitudinal upright 38 of the fastening structure 31 and in the locking bore 51 of the corresponding longitudinal upright 47 of the support platform 33.

In the unlocked position, the locking fingers 60 are disengaged from the locking bores 51 of the longitudinal uprights 47 of the support platform 33.

Each of the locking fingers 60 comprises a frangible zone, configured to break under the effect of an impact on the radio equipment 25, so as to unlock the locking mechanism 56 and allows the support platform 33 to pivot around the pivot axis A.

In particular, this frangible zone is configured to break under the effect of an impact generating forces exceeding a predetermined force threshold. This force threshold is defined as being greater than the forces generated on the locking fingers 60 under normal flight conditions, but lower than the forces that may be generated on the locking fingers 60 under the effect of an impact of a bird on the radio equipment.

Figure 7:
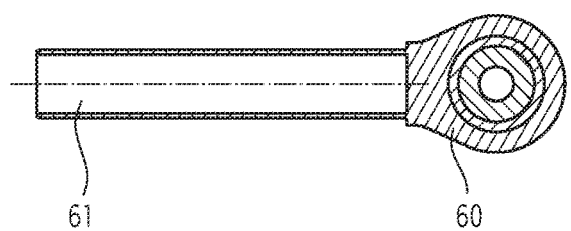
FIG. 7 is a sectional perspective view along a transverse plane of a locking finger of the support device of FIG. 2.

For example, as illustrated in FIG. 7, the frangible zone is formed by an axial weakening bore 61.

The locking mechanism 56 is thus configured to be actuated from its locked configuration to its unlocked configuration as a direct result of an impact on the radio equipment 25 by breaking frangible zones of the locking fingers 60.

The control mechanism 58 is configured to actuate the locking fingers 60, in particular to move the locking fingers 60 from their locked position to their unlocked position.

In particular, the control mechanism 58 is able to transmit a force exerted by an operator to the locking fingers 60 in order to disengage the locking fingers 60 from the locking bores 51.

In the illustrated example, the control mechanism 58 comprises two vertical axes 62a, 62b. Each axis 62a, 62b is mounted on the fastening structure 27 using a bearing 63, allowing the respective axis 62a, 62b to rotate around itself.

Each axis 62a, 62b is also connected to a respective locking finger 60 using a lever 65 fastened to a lower end of the axis 62a, 62b. Each lever 65 is able to drive a translational movement of the respective unlocking finger 60, during the rotation of the axis 62a, 62b, so as to disengage the locking finger 60 from the locking bore 51.

The control mechanism 58 further comprises a control box accessible from the cockpit of the aircraft, for example comprising a control handle able to be actuated by an operator, and a force transmission assembly 66, only one end of which is illustrated in FIG. 6, configured to transmit a mechanical force generated by the actuation of the control box by the operator to rotate a first of the axes 62a, 62b.

The control mechanism 58 further comprises a conjugating connecting rod 67, conjugating the rotation of the two axes 62a, 62b, such that rotating the first axis 62a causes a corresponding rotation of the second axis 62b.

When the support device 27 is mounted in the aircraft 3, the fastening structure 31 being fastened to the lower surface 23 of the fuselage, the upper parts of the axes 62 as well as the conjugating connecting rod 67, the transmission assembly 66 and the control box are positioned inside the fuselage 3, while the lower parts of the axes 62, connected to the locking fingers 60, are positioned outside the fuselage 3. Each axis 62a, 62b, which thus traverses the fuselage 3, is provided with a sealed bearing 68 intended to guarantee sealing of the fuselage 3, which is a pressurized zone.

The control mechanism 58 is thus able to be actuated by an operator and transmit the mechanical force resulting from this actuation to the two locking fingers 60 in order to disengage them from the locking bore 51.

The support device 27 also includes a return mechanism 72, configured to exert a return force on the support platform 33 tending to drive the support platform 33 toward its intermediate equilibrium position.

This return force is exerted both when the locking mechanism 56 is in the locked configuration and when the locking mechanism 56 is in the unlocked configuration.

In particular, when the locking mechanism 56 is in the locked configuration, the locking mechanism 56 opposes the return force exerted by the return mechanism 72 on the support platform 33, preventing any pivoting of the support platform 33 from its operational position to its intermediate equilibrium position.

Conversely, when the locking mechanism 56 is in the unlocked configuration, the return force exerted by the return mechanism 72 is suitable for pivoting the support platform 33 around the pivot axis from its operational position to its intermediate equilibrium position. In particular, when the locking mechanism 56 is in the unlocked configuration, the return mechanism 72 is configured to pivot the support platform 33 around the pivot axis past an intermediate non-return position, described below.

In the illustrated example, the return mechanism 72 includes two return springs 74, each of the return springs 74 connecting the fastening structure 31 to the support platform 33. In particular, each return spring 74 is fastened on the one hand to the transverse upright 39 of the fastening structure 31 and on the other hand to the plate 48 of the support platform 33. Each return spring 74 is configured to exert a force on the support platform 33 tending to drive the support platform 33 toward its intermediate equilibrium position.

Preferably, the support device 27 includes a non-return mechanism 80, intended to prevent the support platform 33 from returning to its operational position, after the locking mechanism 56 has been actuated.

In particular, the non-return mechanism 80 is intended to prevent the support platform 33 from pivoting in the opposite direction toward its operational position, on that side of an intermediate non-return position, when the locking mechanism 56 is in its unlocked configuration and after the support platform 33 is pivoted from its operational position toward its backup position up to this intermediate non-return position.

The pivot angle corresponding to the intermediate non-return position has a predetermined value, hereinafter referred to as threshold value.

This threshold value is below the value of the pivot angle corresponding to the intermediate equilibrium position. The intermediate equilibrium position is therefore situated past the intermediate non-return position.

Thus, the non-return mechanism 80 is configured to prevent the support platform 33 from pivoting toward the operational position on that side of the threshold pivot angle value, when the pivot angle of the support platform 33 has a value exceeding the threshold value. Thus, once the pivot angle reaches the threshold value, in particular when the support platform 33 is in the intermediate equilibrium position, the non-return mechanism 80 prevents any pivoting of the support platform 33 on that side of the threshold value.

The threshold value is preferably comprised between 35° and 45°, in particular equal to 40°.

In the described example, the non-return mechanism 80 comprises two retractable fingers 82 mounted on the fastening structure 31 and two associated slots 84 formed on the support platform 33.

Each retractable finger 82 is fastened to a respective longitudinal upright 38 of the fastening structure 31.

Each retractable finger 82 is able to occupy a deployed position, in which the retractable finger 82 protrudes transversely in the space 40 with a first length L1, and a retracted position, in which the retractable finger 82 protrudes transversely in the space 40 with a second length L2, strictly smaller than the first length L1, or is completely retracted in the longitudinal upright 38, in particular flush with the inner surface of the longitudinal upright 38.

The deployed position is an idle position of the retractable finger 82, i.e., without any stress, the retractable finger 82 occupies the deployed position. In particular, the retractable finger 82 comprises an inner spring, compressed when the retractable finger is in its retracted position, i.e., when a stress is exerted on the retractable finger 82. This inner spring is able to deploy when the stress exerted on the retractable finger 82 ceases, causing the deployment of the retractable finger 82.

Each slot 84 is formed on the outer surface of a longitudinal upright 47 of the support platform 33, i.e., on the surface intended to be across from a respective longitudinal upright 38 of the fastening structure 31.

Each slot 84 is configured to receive a retractable finger 82 in its deployed position only when the pivot angle of the support platform exceeds the pivot angle threshold value. In particular, each slot 84 forms an arc of circle centered on the pivot axis A and corresponding to the trajectory of the retractable finger on the longitudinal upright 47 during pivoting of the support platform 33 from the pivot angle threshold value toward the backup position. Each slot 84 for example has a depth substantially equal to the first length L1 of the retractable fingers 82.

When the support platform 33 is in its operational position, the retractable fingers 82 are abutting against the longitudinal uprights 47 of the support platform 33, while occupying their retracted position, the inner springs of the retractable fingers 82 being compressed. Once the pivot angle of the support platform 33 reaches the threshold value, the stress exerted by the longitudinal uprights 47 on the retractable fingers 82 ceases. Thus, the inner spring of each retractable finger is deployed and each retractable finger 82 is deployed in the respective slot 84. Each retractable finger 82 is next kept in its deployed position by the force exerted by the respective inner spring.

Each slot 84 also forms a stop preventing the support platform 33 from returning.

Thus, each slot 84 allows the deployment of a retractable finger 82 once the value of the pivot angle of the support platform 33 reaches the threshold value, and thus prevents any pivoting of the support platform 33 from a position corresponding to a pivot angle greater than or equal to the threshold value toward a position corresponding to a pivot angle below the threshold value.

The use of the support device during a flight of the aircraft, to retract the electrical equipment 25 in a refuge zone of the fuselage 3, in a landing situation in case of failure of the landing gear that would prevent it from being deployed or upon an impact with a bird, will now be described in reference to FIGS. 8 to 11.

Under normal flight conditions, i.e., without any risk of belly landing or any impact on the radio equipment 25, the support platform 33 is in its operational position, the locking mechanism 56 being in its locked configuration and keeping the support platform 33 in its operational position.

As described above, in this operational configuration, the locking mechanism 56 opposes the return force exerted by the return mechanism 72 on the support platform 33, preventing any pivoting of the support platform 33 from its operational position to its backup position.

Furthermore, the retractable fingers 82 are in their retracted position.

The radio equipment 25, assembled to the support platform 33, is in its deployed position, and thus protrudes in a vertical direction, i.e., substantially orthogonal to the lower surface 23 of the fuselage 3. The radio equipment 25 can be rotated around its vertical axis by an appropriate mechanism, depending on the targeted applications.

When a landing of the aircraft 1 with a failure of the landing gear preventing the deployment of the latter is anticipated, during a preparation phase for this landing, an operator steers the radio equipment 25 by pivoting it around its axis to orient this radio equipment 25 along the axis X, such that the pivoting of the radio equipment 25 to the refuge zone of the fuselage 3 is not hindered.

The operator then actuates the control mechanism 58 to unlock the locking mechanism 56.

To that end, the operator actuates the control handle, and the mechanical force generated by this actuation is transmitted by the force transmission assembly 66 to the first axis 62a, causing this axis 62a to rotate around itself.

The conjugating connecting rod 67 transmits this rotational movement to the second axis 62b, driving a corresponding rotation of the second axis 62b around itself.

The rotation of the first and second axes 62a, 62b drives a translational movement of the locking fingers 60 and a simultaneous disengagement of the locking fingers 60 from the locking bores 51.

The return force exerted by the return mechanism 72 on the support platform 33, supplemented by gravitational force exerted on the support platform 33, drives a pivoting of the support platform 33 to its intermediate equilibrium position, and the corresponding pivoting of the radio equipment 25 supported by the support platform 33, backward and upward.

During this pivoting, once the pivot angle of the support platform 33 reaches the threshold value, for example 40°, the retractable fingers 82 are deployed in the slots 84, thus preventing any pivoting of the support platform 33 in the opposite direction toward a pivot angle below this threshold value.

The angle formed between the radio equipment and the vertical is then greater than this threshold value.

Figure 8:
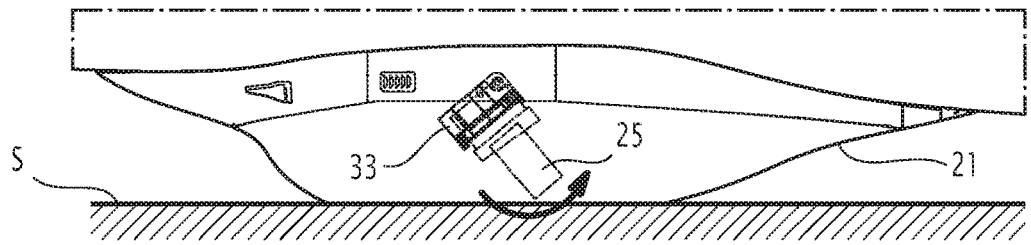
FIGS. 8 and 9 are sectional profile views of an aircraft during an emergency landing.
Figure 9:
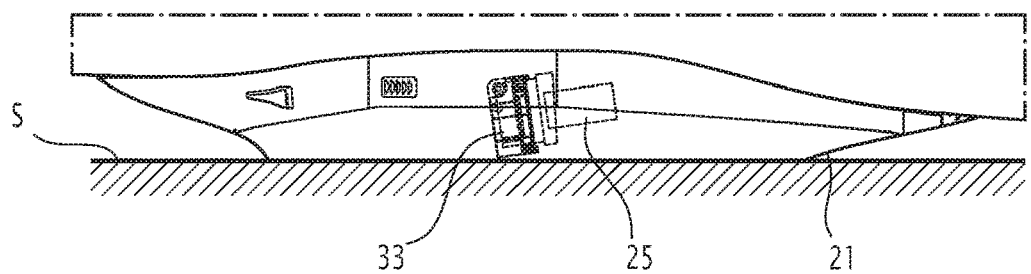
Figure 10:
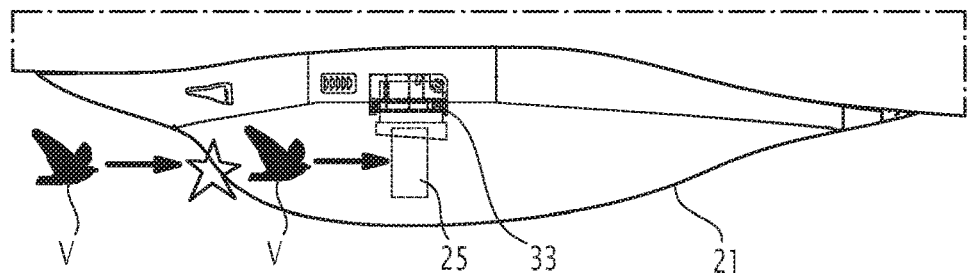
FIGS. 10 and 11 are sectional profile views of an aircraft during an impact with a bird.

When the aircraft 1 comes into contact with the ground S, and when the aircraft 1 slides on the ground, the landing gear being retracted, the radome 21 retracts and the radio equipment 25 comes into contact with the ground, as illustrated in FIG. 8. Under the effect of this contact, as illustrated in FIG. 8, the radio equipment 25 and the support platform 33 pivot around the pivot axis A from the intermediate equilibrium position to the backup position, the electrical equipment 25 being housed in the refuge zone of the fuselage 3, without inducing any force in the structure of the aircraft 1.

Thus, in case of a belly landing, the support device 27 makes it possible to retract the radio equipment 25 in the refuge zone of the fuselage and retain the sliding conditions of the aircraft 1 on the ground, which remain identical to those of a basic aircraft, i.e., without any such radio equipment. The presence of the electrical equipment 25 in the belly position on the aircraft 1 therefore does not modify the behavior of the aircraft in case of belly landing.

From the normal flight conditions described above, in case of collision with a bird V traversing the radome 21 impacting the radio equipment 25 (FIG. 10), the forces generated by this impact are transmitted to the support platform 33 up to the locking fingers 60.

These forces cause the frangible zone 61 of each locking finger 60 to break, causing a simultaneous separation of the locking fingers 60 from the locking bores 51 and thus a release of the locking mechanism 56 from its locked configuration to its unlocked configuration.

Figure 11:
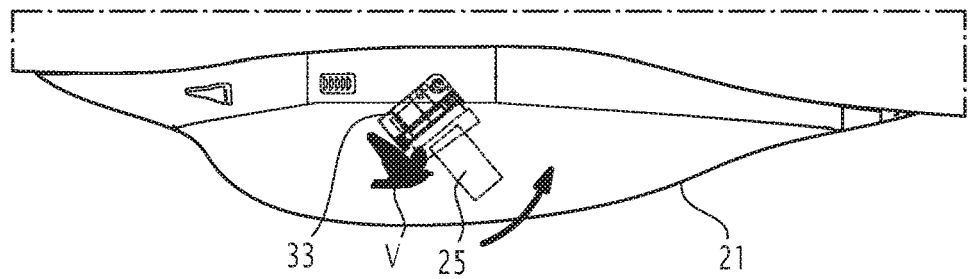

The return force exerted by the return mechanism 72 on the support platform 33, supplemented by gravitational force exerted on the support platform 33 and the forces created by the impact of the bird, drives a pivoting of the support platform 33 around the pivot axis A to the intermediate equilibrium position, and the corresponding pivoting of the radio equipment 25 supported by the support platform 33, backward and upward (FIG. 11).

As described above, during this pivoting, once the pivot angle of the support platform 33 reaches the threshold value, for example 40°, the retractable fingers 82 unfold in the slots 84, thus preventing any pivoting of the support platform 33 in the opposite direction toward a pivot angle below this threshold value.

Thus, in case of impact with a bird, the automatic unlocking of the locking mechanism 56 and the pivoting of the support platform 33 and the radio equipment 25 resulting therefrom, makes it possible to dissipate the forces generated by the impact, by reducing the forces induced in the structure of the aircraft.

The risks of debris ejection and ingestion of this debris by the engines of the aircraft 1 are then reduced.

The support device disclosed herein thus makes it possible both to minimize the interference of the radio equipment with the ground during an emergency landing and to reduce the risks of damage to the aircraft during an impact with a bird.

Furthermore, this support device can be installed on a primary structure of an aircraft, without major modification of this primary structure.

Moreover, the support device does not require any motor means, the pivoting of the support platform involving only a mechanical force, without any auxiliary energy being present. The upkeep of the support device and the risk of failure of this device are then minimized.

It must be understood that the example embodiments described above are not limiting.

In particular, it will be understood that during a belly landing, with no actuation of the control mechanism by an operator, the locking mechanism 56 is suitable for being actuated from its locked configuration to its unlocked configuration as a direct result of the impact of the radio equipment on the ground. Indeed, the locking fingers are configured to break under the effect of this impact, the locking mechanism then being unlocked.

According to one alternative, the support device has no control mechanism, the locking mechanism 56 then being configured to be actuated from its locked configuration to its unlocked configuration solely as a direct result of an impact on the radio equipment, irrespective of whether this impact is an impact with a bird or with the ground.

Alternatively, the support device has no return mechanism, the axes A and B being positioned relative to one another such that the support platform pivots from the operational position to the intermediate equilibrium position under the effect solely of the gravitational force when the locking mechanism is actuated from its locked configuration to its unlocked configuration.

What is claimed is:

1. A support device of a piece of radio equipment of an aircraft, the support device comprising:
    a fastening structure configured for securing to a lower surface of a fuselage of the aircraft;
    a support platform of the radio equipment, configured to receive the radio equipment, the support platform being mounted pivotable on the fastening structure around a pivot axis between an operational position and a backup position, the pivot axis being configured for extending parallel to the lower surface of the fuselage; and
    a lock configured to be actuated from a locked configuration, in which the lock keeps the support platform in the operational position while preventing any pivoting of the support platform around the pivot axis, to an unlocked configuration, in which the lock allows the support platform to pivot relative to the fastening structure around the pivot axis, toward the backup position.

2. The support device according to claim 1, wherein:
    in the operational position, the support platform is configured to keep the radio equipment in a deployed position, in which the radio equipment is configured to protrude in a direction substantially orthogonal to the lower surface of the fuselage, and
    in the backup position, the support platform is configured to keep the radio equipment in a retracted position, in which the radio equipment is configured to be housed in a refuge zone of the fuselage.

3. The support device according to claim 1, further comprising a control mechanism, configured to be actuated by an operator, the lock being configured to be actuated from the locked configuration to the unlocked configuration when the operator actuates the control mechanism.

4. The support device according to claim 3, wherein the lock comprises at least one locking finger movable from a locked position, in which the locking finger prevents any pivoting of the support platform around the pivot axis, to an unlocked position, in which the locking finger allows the support platform to pivot relative to the fastening structure around the pivot axis, and the control mechanism is configured so as, when the control mechanism is actuated, to move the locking finger from the locked position to the unlocked position.

5. The support device according to claim 1, wherein the lock comprises at least one locking finger movable from a locked position, in which the locking finger prevents any pivoting of the support platform around the pivot axis, to an unlocked position, in which the locking finger allows the support platform to pivot relative to the fastening structure around the pivot axis.

6. The support device according to claim 5, wherein the locking finger comprises at least one frangible zone, configured to break under an effect of an impact on the radio equipment, the lock being able to be actuated from the locked configuration to the unlocked configuration by breakage of the frangible zone under the effect of the impact on the radio equipment.

7. The support device according to claim 6, wherein the at least one frangible zone is configured to break under the effect of an impact generating force exceeding a predetermined force threshold, the predetermined force threshold being defined as being greater than forces generated on the at least one locking finger under normal flight conditions, but lower than forces generated on the at least one locking finger under an effect of an impact of a bird on the radio equipment.

8. The support device according to claim 6, wherein the at least one frangible zone is formed by an axial weakening bore in the at least one locking finger.

9. The support device according to claim 1, wherein the support platform is configured to pivot around the pivot axis from the operational position to an intermediate equilibrium position, when the lock is actuated from the locked configuration to the unlocked configuration.

10. The support device according to claim 9, further comprising a return mechanism, configured to exert a return force on the support platform, the return mechanism being configured so as, when the lock is in the unlocked configuration, to pivot the support platform around the pivot axis from the operational position to the intermediate equilibrium position.

11. The support device according to claim 9, wherein the intermediate equilibrium position is a stable position of the support platform, the support platform being configured to pivot around the pivot axis from the operational position to the intermediate equilibrium position, under the effect solely of the gravitational force or under a return force from a return mechanism, when the locking mechanism is actuated from the locked configuration to the unlocked configuration.

12. The support device according to claim 1, further comprising a non-return mechanism, configured so as, when the lock is in the unlocked configuration, to prevent the support platform from pivoting to the operational position.

13. The support device according to claim 12, wherein the non-return mechanism is configured so as, when a pivot angle of the support platform exceeds a predetermined threshold value, the predetermined threshold value corresponding to a threshold position of the support platform, to prevent the support platform from pivoting toward the operational position below the threshold position.

14. The support device according to claim 13, wherein the predetermined threshold value is comprised between 35° and 45°.

15. The support device according to claim 13, wherein the non-return mechanism comprises at least one retractable finger, configured to be deployed during a pivoting of the support platform around the pivot axis toward the backup position when the pivot angle of the support platform reaches the predetermined threshold value, the retractable finger being configured so as, when the retractable finger is deployed, to prevent the support platform from pivoting toward the operational position on that side of the threshold position.

16. A radio system comprising:
the support device according to claim 1; and
a piece of radio equipment mounted on the support platform.

17. An aircraft comprising:
a fuselage; and
the radio system according to claim 16, the structure for fastening the support device being secured to a lower surface of the fuselage.

18. The aircraft according to claim 17, further including a radome attached on the fuselage and covering the radio system.

19. The aircraft according to claim 17, wherein the fuselage defines a refuge zone, and wherein:
in the operational position, the support platform is configured to keep the radio equipment in a deployed position, in which the radio equipment protrudes in a direction substantially orthogonal to the lower surface of the fuselage, and
in the backup position, the support platform is configured to keep the radio equipment in a retracted position, in which the radio equipment is housed in the refuge zone of the fuselage.

20. A support device of a piece of radio equipment of an aircraft, the support device comprising:
a fastening structure configured for securing to a lower surface of a fuselage of the aircraft;
a support platform of the radio equipment, configured to receive the radio equipment, the support platform being mounted pivotable on the fastening structure around a pivot axis between an operational position and a backup position, the pivoting of the support platform between the operational position and the backup position being configured to make the radio equipment move from a deployed position, in which the radio equipment is configured to protrude in a direction substantially orthogonal to the lower surface of the fuselage, to a retracted position, in which the radio equipment is configured to be housed in a refuge zone of the fuselage; and
a lock configured to be actuated from a locked configuration, in which the lock keeps the support platform in the operational position while preventing any pivoting of the support platform around the pivot axis, to an unlocked configuration, in which the lock allows the support platform to pivot relative to the fastening structure around the pivot axis, toward the backup position.

* * * * *